UNITED STATES PATENT OFFICE.

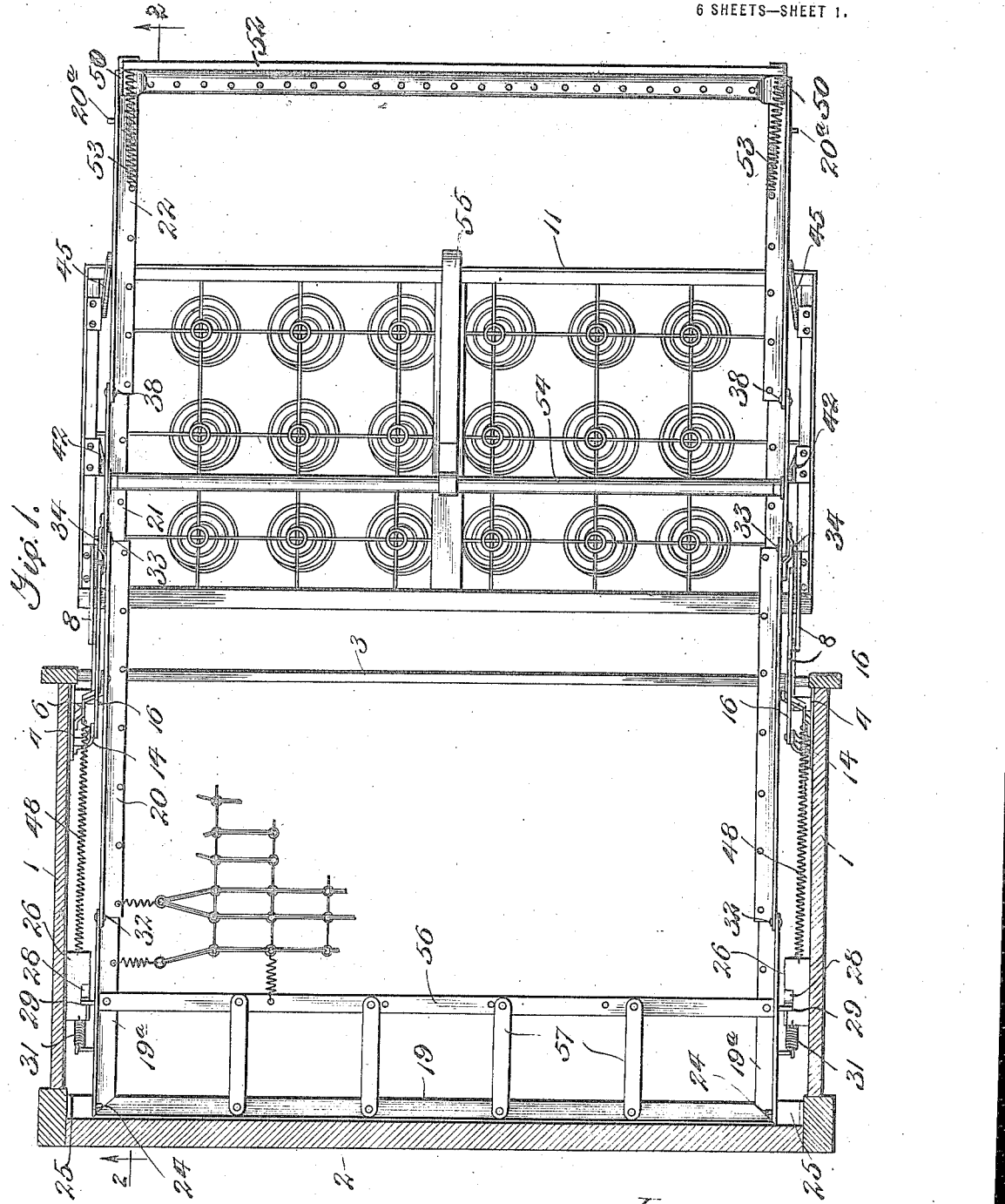

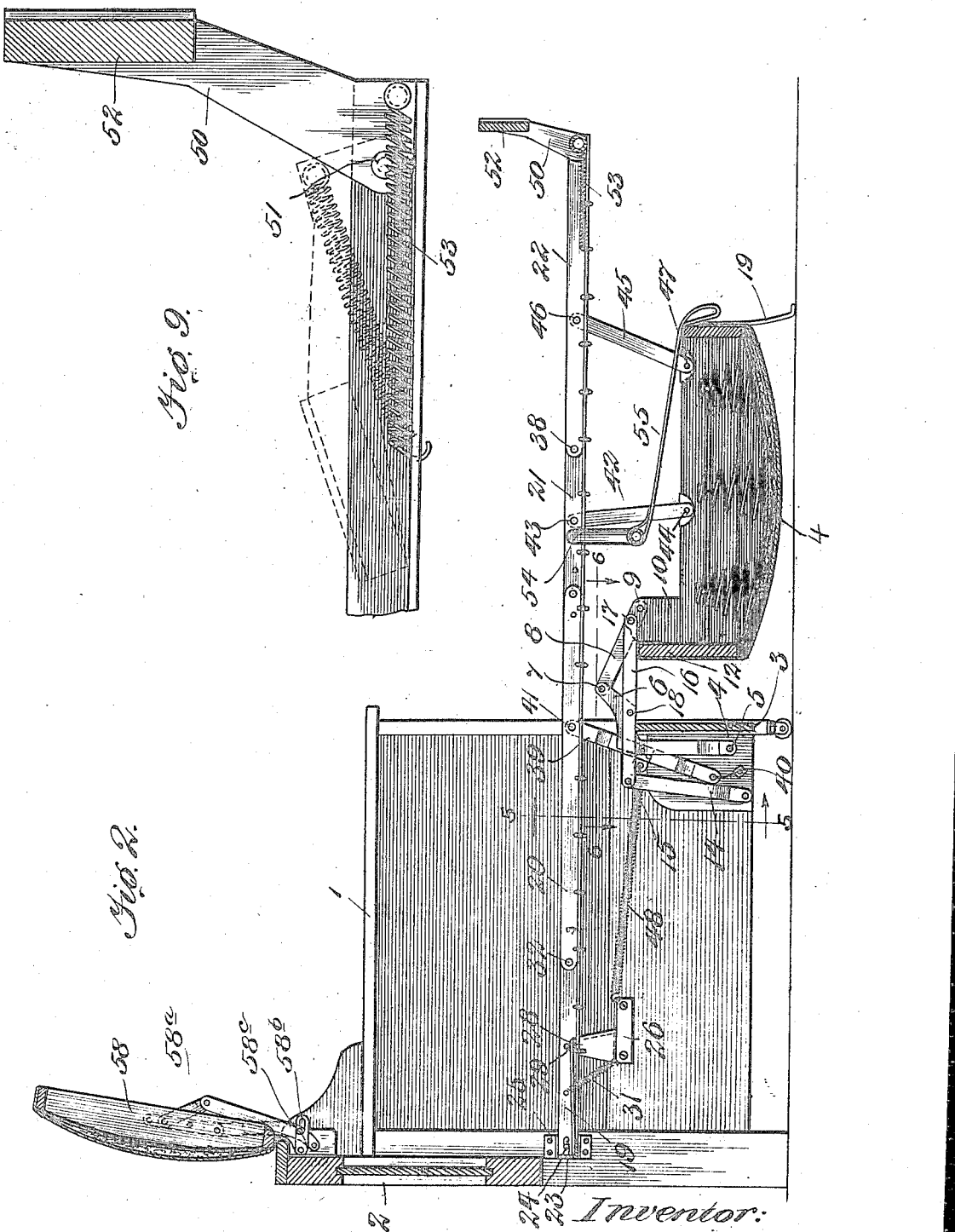

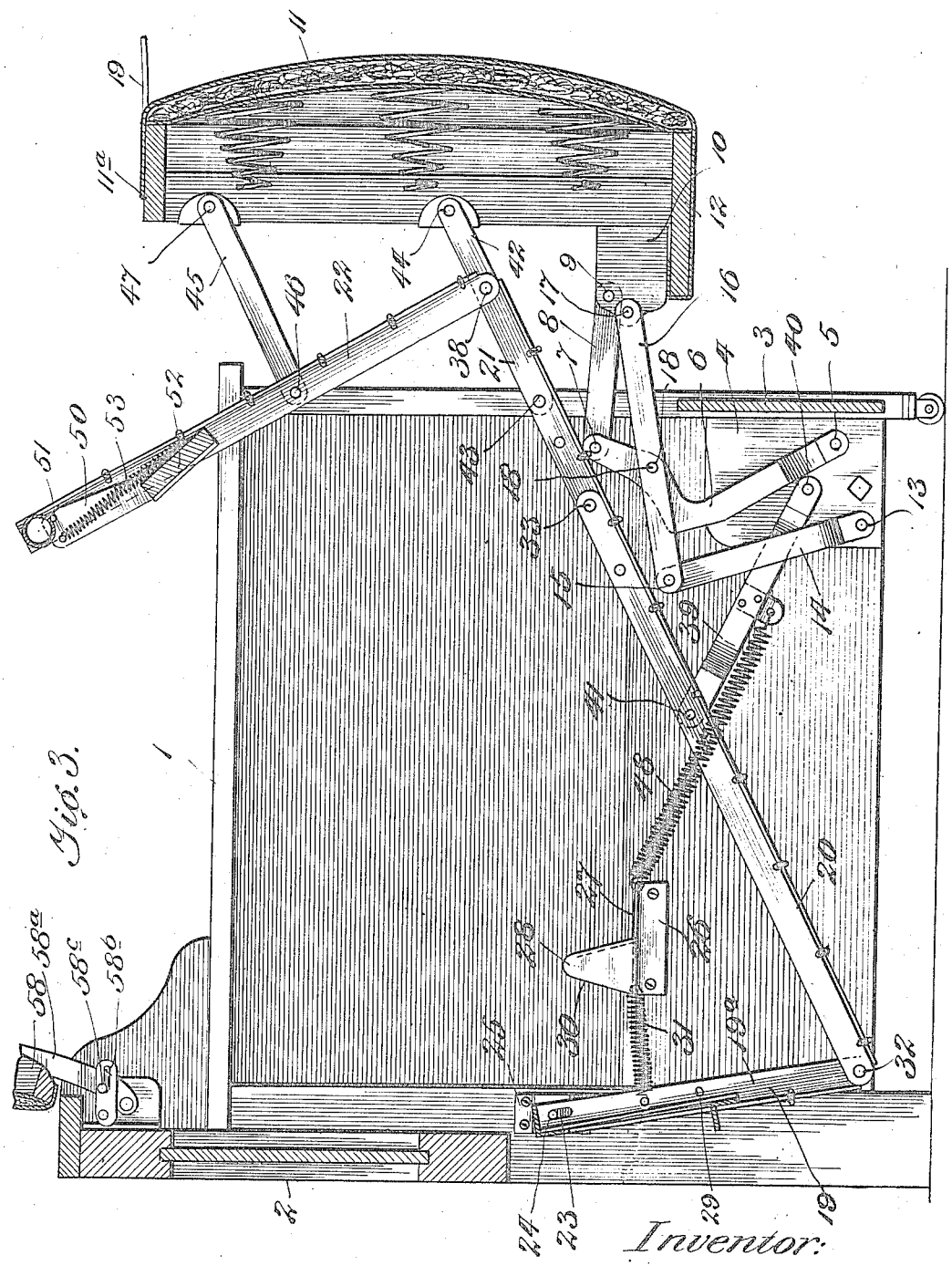

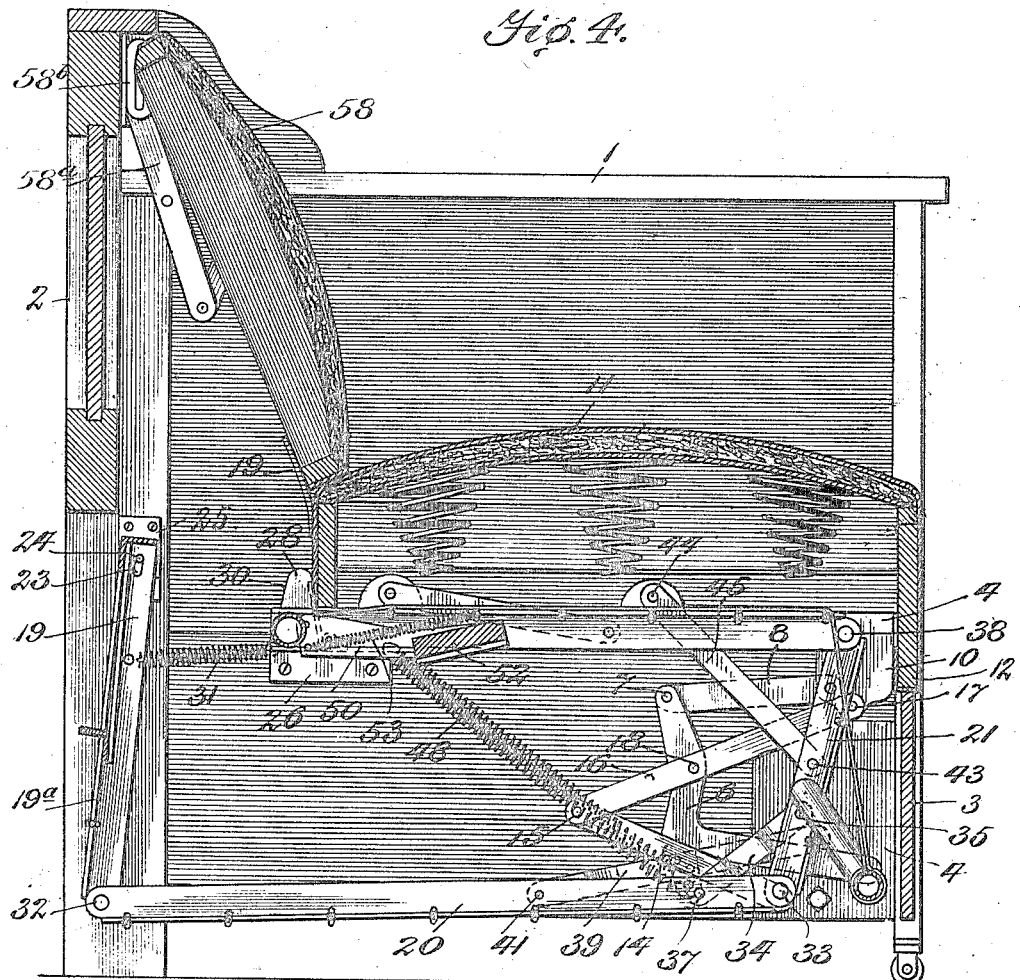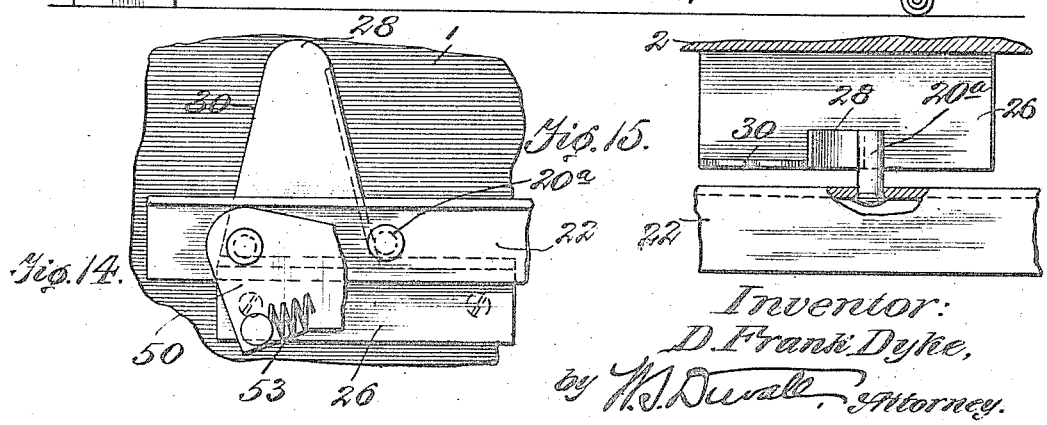

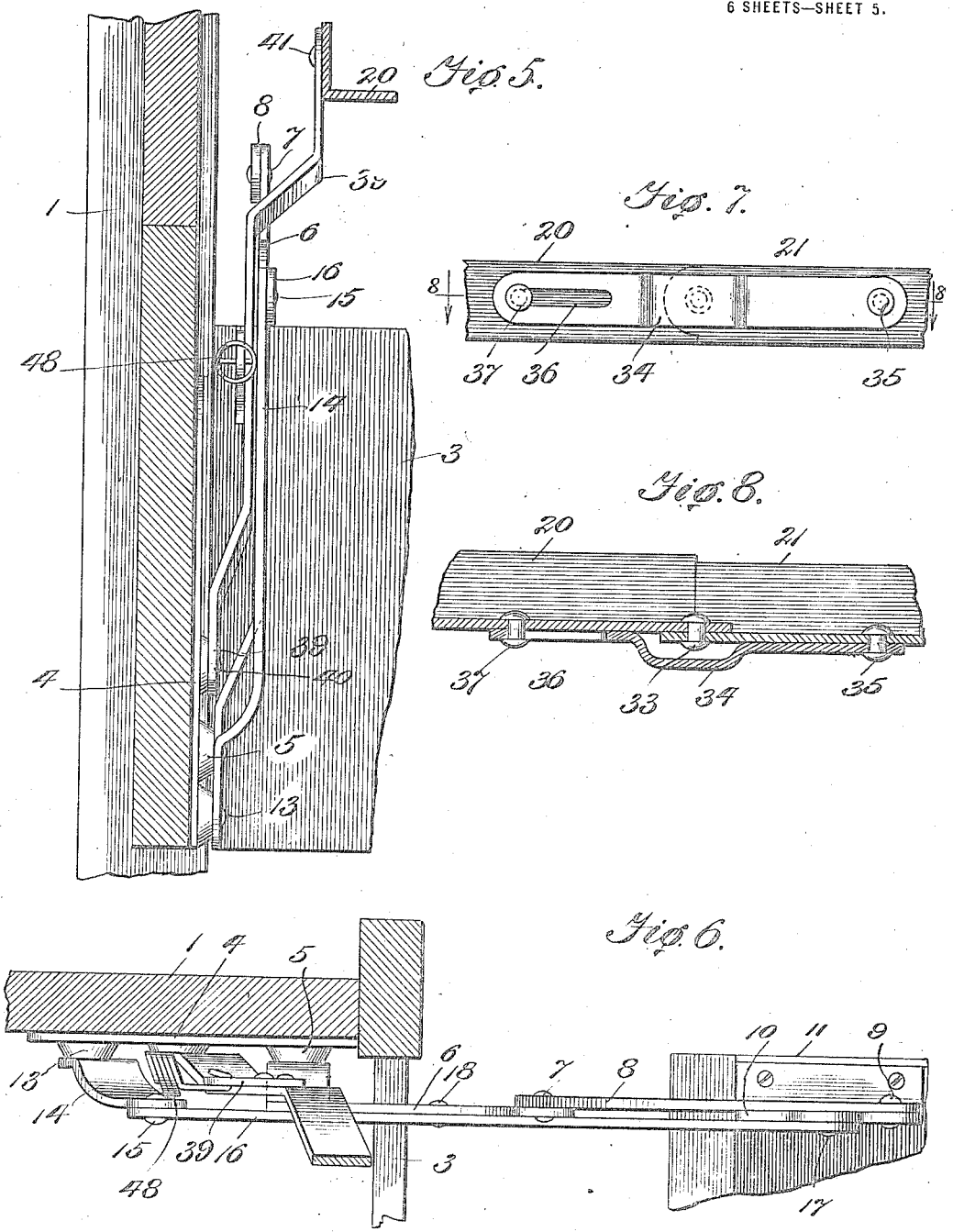

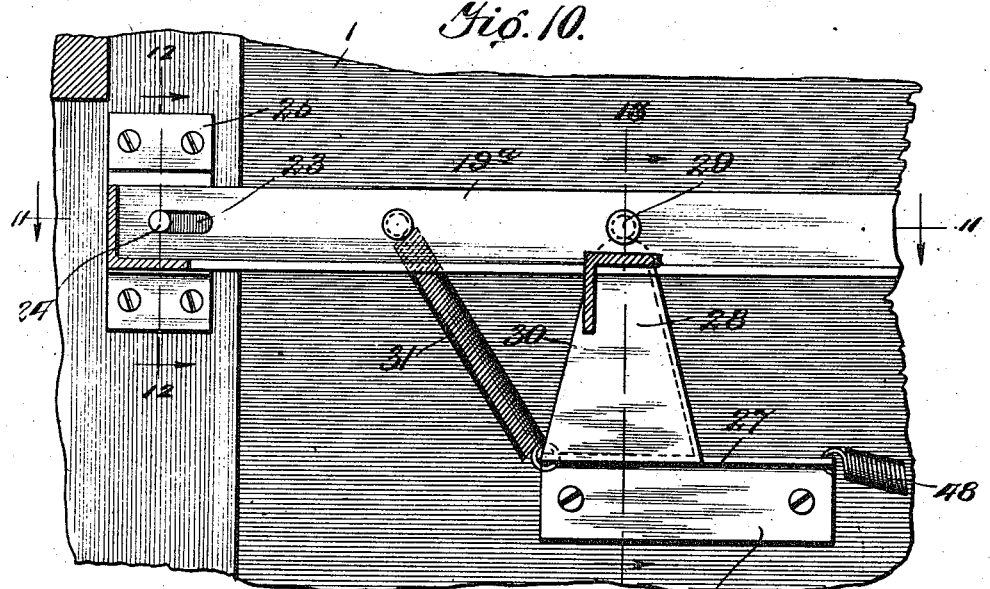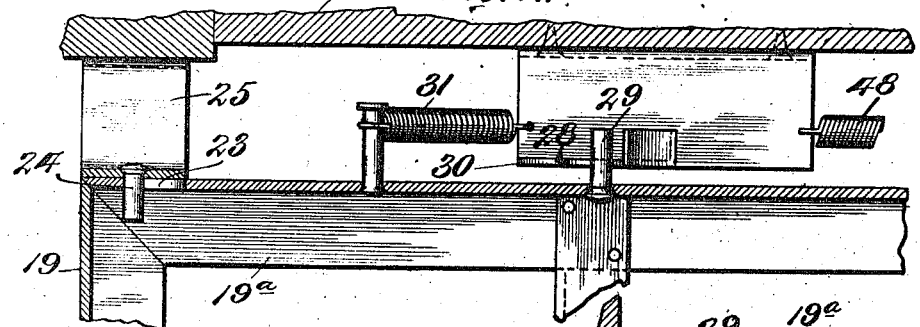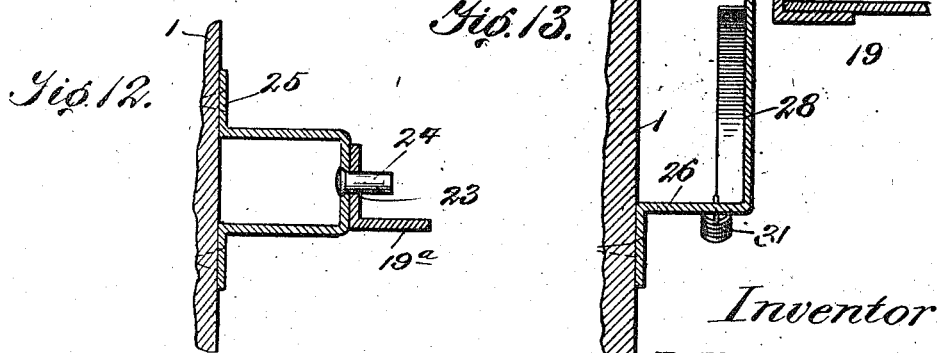

DARRELL FRANK DYKE, OF CHICAGO, ILLINOIS, ASSIGNOR TO THE SENG COMPANY, OF CHICAGO, ILLINOIS, A CORPORATION OF ILLINOIS.

SOFA BED.

1,424,285. Specification of Letters Patent. Patented Aug. 1, 1922.

Application filed August 18, 1916, Serial No. 115,600. Renewed January 9, 1922. Serial No. 528,094.

*To all whom it may concern:*

Be it known that I, DARRELL FRANK DYKE, a citizen of the United States, residing at Chicago, in the county of Cook and State of Illinois, have invented a new and useful Sofa Bed, of which the following is a specification.

This invention relates to improvements in sofa-beds, and more especially to that class of sofa-beds wherein is involved a sofa-seat adapted to be inverted when positioned in front of the sofa-frame and above which is supported in extended position the woven-wire bed-bottom forming the mattress-support, and wherein, when said sofa-seat occupies its normal position within the sofa-frame, the bed-bottom folds into sections under the seat and within the sofa-frame and are so relatively positioned as to form a space in which the mattress and other bedding may be conveniently folded and stored.

The objects of the invention, together with the novel features thereof, will hereinafter appear and be particularly pointed out in the claims.

Referring to the drawings:

Fig. 1 is a horizontal sectional view through the sofa-frame at a point above the mattress-supporting bed-bottom, the latter being shown in bed position and the fabric broken away to avoid confusion;

Fig. 2 is a vertical longitudinal sectional view on the line 2—2 of Fig. 1, the bed-bottom being extended into bed-form as in Fig. 1;

Fig. 3 is a view similar to Fig. 2, but illustrating the parts in the position they occupy when the bed has been partly closed by raising the seat and end-section;

Fig. 4 is a similar view illustrating the bed with the seat in its normal position within the sofa-frame and the bed-frame folded within the sofa-frame and below the seat;

Fig. 5 is a fragmentary view in vertical section on the line 5—5 of Fig. 2;

Fig. 6 is a fragmentary view in horizontal section on the line 6—6 of Fig. 2;

Fig. 7 is a side elevation of the joint between the side-rails of the spacing-section and main-section illustrating the means for temporarily locking these sections during a part of the operation of conversion;

Fig. 8 is a longitudinal sectional view on the line 8—8 of Fig. 7;

Fig. 9 is a vertical transverse sectional view of the outer end of the end-section, the folding foot-end being shown elevated into operative position in full lines and as folded in dotted lines;

Fig. 10 is a fragmentary view in side elevation of one of the sofa-ends, the parts illustrated being shown in the position they occupy when the sofa is in bed-form;

Fig. 11 is a horizontal sectional view on the line 11—11 of Fig. 10;

Fig. 12 is a vertical sectional view on the line 12—12 of Fig. 10;

Fig. 13 is a vertical sectional view on the line 13—13 of Fig. 10;

Fig. 14 is a fragmentary view in elevation of one of the sofa-ends, the parts illustrated being shown in the position they occupy when the bed is folded and adapted to be used as a sofa; and Fig. 15 is a plan view of the parts illustrated in Fig. 14.

Like numerals of reference indicate like parts in all the figures of the drawings.

In practicing the invention, I may employ any style of sofa-frame, which as usual, consists of the two opposite sofa-ends 1, and the connecting back and front 2 and 3, respectively. In order that a space between the sofa-seat and upholstered back 58, may be avoided, and for other reasons hereinafter apparent, I prefer to employ in connection with said sofa-back a suitable mechanism whereby the sofa-back may be shifted or raised so as to release the seat and any parts carried thereby and positioned in rear of and covered from view by said back. As various mechanisms are applicable for this purpose, the particular mechanism shown need not be employed. However, it will be seen that as thus supported duplicate toggle-levers $58^a$ connect the upholstered back and sofa-ends, so that said back may be raised to the position shown in Figs. 2 and 3, or lowered to the position shown in Fig. 4. When elevated the sofa-back may be automatically locked against accidental falling by means of a slotted and notched gravity-pawl $58^b$, cooperating with a stud $58^c$, or, any other convenient means may be substituted.

In this instance, there is bolted, or otherwise removably or permanently secured to the inner side of each of the sofa-ends 1, immediately back of the front connecting panel 3 of the frame, a metal supporting-plate 4, the same being of any desired design capable of supporting the movable parts now to be described as carried thereby.

Pivoted as at 5, to each of these supporting-plates is a bell-crank lever 6, which when the parts are in bed-form, extend upwardly immediately in rear of the panel 3 and over and beyond the same. This upper overhanging end of the bell-crank has pivoted to it, as at 7, a short supporting link 8, the front or opposite end of which is pivoted, as at 9, to a bracket 10, secured to and depending from the underside of the sofa-seat at or near what would be the front rail 12 of the latter when in its closed position. In rear of each bell-crank lever 6, and pivoted below and in rear and therefore eccentrically with relation to the same and upon the supporting-plate 4, as indicated at 13, is an equalizing-link 14, of somewhat less length than the bell-crank 6 and which terminates below the same. The upper end of each of the links 14 is pivotally connected, as at 15, to an equalizing-bar 16, the front end of the latter being pivotally connected as at 17, to the bracket 10 of the seat eccentrically with relation to the pivotal connection between said bracket and the short supporting link 8. The equalizing bar 16 intersects or crosses the upper branch of the bell-crank 6 at a point between its angle and end, and at such point of intersection the equalizing bar is pivotally connected to the bell-crank as at 18 eccentrically with the pivot 9. This arrangement, as will be seen, provides a system of links and levers the result of which is that as the sofa-seat 11 is elevated at its rear edge and swung outward toward its position in front of the sofa-frame it is gradually and positively half turned or rotated at its front edge and when finally positioned in front of the sofa-frame it is completely inverted in which position the now front edge of the sofa-seat is supported by suitable legs 19.

As the seat is turning to assume the position shown in Fig. 2, the positions of the pivots 9 and 17 are changing from those shown in Fig. 4 to those shown in Fig. 2, or, in other words, the positions of these pivots are substantially reversed; so that when the pivots 9 have passed sufficiently far beyond and below the pivots 17, the front rail 12 of the seat will abut upwardly against the lower edges of the equalizing-bars and all further turning movement of the seat will terminate. The seat will be thus supported at what is now its rear edge by the supporting-links 8 and the equalizing-bars 16.

The equalizing-links 14 and the bell-crank levers slightly incline toward each other, or, in other words, are preferably not parallel (see Fig. 2), so that they have but a limited mutually forward movement which when reached resolves them into a rigid support for the inner edge of the inverted seat.

These legs are preferably rigidly secured to the sofa-seat, in order to lend stability, and when the seat occupies its normal position and the bed is folded, said legs extend vertically immediately in rear of the shifting sofa-back and are hidden by the latter. In order that these legs may clear the sofa-back is one reason why a shifting-back is desirable. When the seat is raised and swung inward, the mechanism described will serve to turn or reverse the seat, whereby the upholstered part is brought uppermost and the seat therefore is positioned to serve as such. It will be apparent, by reference to Fig. 4, that when in the latter position, the bell-crank levers 6 and equalizing-links 14 assume an inclined position, the equalizing-bars, of course, being oppositely inclined to the equalizing links. As the rear edge of the seat is elevated during the opening operation, the bell-crank-levers and equalizing-links move in unison on their pivots toward the vertical, these two elements constantly changing their relative positions by reason of their relatively eccentric pivotal connections 5 and 13 and the connection 18. As they approach this position, by reason of the fact that the supporting links 8 work on the arc of a circle greater than do the outer ends of the equalizing-bars, the supporting links and front ends of the equalizing bars do not travel in exact unison or the same speed, the supporting links 8 moving the faster of the two, so that the equalizing-bars act to retard, and, hence, in a manner and to a certain extent, hold, while the supporting links 8 continuing their movement, turn the seat. So, also, in the return movement, the equalizing-bars temporarily remain stationary, their front pivots 17 serving as fulcrums upon which the seat is partially turned, after which the links 8 and equalizing-bars 16 working in opposite directions as the seat travels backward operate to turn the seat the remainder of the way necessary to bring it to its normal position.

The mattress-supporting bed-bottom, in the present instance, consists of four sections, which, for convenience, I will term the back-section 19, the main-section 20, the spacing-section 21, and the end-section 22. These several sections, it will be understood, are preferably formed of angle-iron and articulated or pivoted together, as is usual in sofa-bed constructions, and over the whole frame thus formed there is stretched and secured in the usual manner the woven-wire mattress supporting-fabric, a fragment of which is shown in Fig. 1. The side-bars 19ª of the back-section 19, are, near their rear ends, provided with short slots 23, (see Figs. 10 and 11), which receive and move over corresponding fixed studs 24, that extend from the faces of securing-plates 25, secured to the inner sides of the rear corner-posts of the sofa-ends 1, whereby the back-section 19 is capable of pivotal movement and the entire bed-bottom a slight reciprocal movement the length of the slots 23.

Bracket-plates 26 are also secured to the sofa-ends 1, in advance of the stud-plates 25, and are of angular formation in section. That is to say, each bracket-plate has formed at its upper edge a horizontal laterally disposed supporting-flange 27, the same extending inward, and from the edge of said flange there extends upwardly a substantially triangular combined guiding and supporting-standard. The standards 28 coact with and are adapted to be engaged by headed pins 29, which project outwardly from the side-bars 19ª of the back-section 19, so that when said section is swung to a horizontal position, as when the sofa is in bed-form, the pins 29 will rest upon the upper ends of the standards 28 and the latter will, therefore, serve as supports for said bed-section. In traveling to this position, it will be seen that the headed pins 29 will ride up the rear inclined guide-edges 30 of the standards 28 and finally rest upon the latter. It is for this purpose that the described loose connections are formed between the opposite sides of the back-section 19 and the sofa-ends, by which it will be seen that said section in its travel must swing upward and then move forward a slight distance—the length of the slots 23—to gain its supported position on the standards 28. In order to draw the section 19, and in fact, the entire bed-bottom forward when the headed pins pass above the inclined guide edges 30, I may employ opposite helical springs 31, connecting the rear ends of the same to suitable points on the back-section and the front ends at some other convenient point, in this instance, the bracket-plates 26. These springs have a tendency to draw the back-section forward, thus aiding in its elevation and cause the headed-pins to mount the standards.

The side-bars of the main-section 20 are pivoted in break-joint-fashion at their rear ends, as at 32, with the front ends of those of the back-section 19, and at their front ends are similarly pivoted, as at 33, to the adjacent ends of the side-bars of the spacing-section 21. The latter joint is preferably bridged by short holding-links 34, (see Figs. 6, 7 and 8), said links being pivoted at their front ends, as at 35, to the side-bars of the spacing-section 21, and near their rear ends slotted, as at 36, to receive studs 37, projecting from the side-bars of the main-section 20. The function of these holding-links will hereinafter appear. The opposite end of the spacing-section 21 is pivoted, as at 38, to the end-section 22, and so as to break joint therewith. The woven-wire bed-bottom will fold, of course, coincident with the bed-sections.

Main-section supporting-links 39, are pivoted at 40, to the supports 4, and at their upper ends are pivoted at intermediate points, as at 41, to the side-bars of the main-section 20. Supporting-links 42, are pivoted, as at 43, to the side-bars of the short spacing-section, and at their opposite ends, as at 44, to the underside and at the ends of the seat 11, adjacent its middle. Companion supporting-links 45, are pivoted to and intermediate the side-bars of the end-section 22, as at 46, and at their opposite ends, as at 47, to the underside of the ends of the seat beyond the pivots 44 of the supporting-links 42. These links 42 and 45, when the device is in bed-form, diverge somewhat at their upper ends (see Fig. 2) and by this opposite inclination combine to resist any tendency of the bed-bottom to yield or break-joint at the pivots 38 when weight is placed thereon.

To aid in elevating the parts, helical springs 48, may be connected at their rear ends to the flanges 27 of the brackets 26, or to any other convenient points of the structure, and at their opposite ends to intermediate points of the main-section supporting-links 39. These springs, it will be seen, will be under tension both when the bed is folded and unfolded, and therefore aid in both closing and opening the bed.

There may be also added to the end-section 22, if desired, any preferred form of folding foot-section. If employed, I prefer the construction illustrated in detail in Fig. 9, wherein a pair of standards 50, are pivoted as at 51, to the side-bars of the end-section 22, and connected at their upper ends by a cross-piece 52. Helical springs 53, are connected at their inner ends to the side-bars of the end-frames and at their outer ends to the standards 50 at points beyond the pivots 51. The bottom ends of these standards are widened and squared so as to rest squarely upon the side-bars. The tendency of the springs, when the standards are raised, is to maintain them in such position, and when lowered, to retain them in their lowered position, this by reason of the fact that the springs are connected eccentrically with relation to the pivots of the standards, and hence, the springs 53 will be thrown to opposite sides of the pivots 51 and thus maintain the foot-section in either its raised or lowered position.

The bed-bottom as a whole is stiffened or braced by a transverse tubular brace 54, the same being arched between its ends, which latter, enter the side-rails of the spacing-section 21. A flexible strap 55, may be connected to this brace and also to some convenient point of the sofa-seat frame, the object being to permit a limited swinging movement of the brace and yet retain the brace in proper position during the folding or closing operation of the bed.

Each of the side-bars of the end-section is provided with an outwardly disposed headed rest-pin 20ª, such pins, when the parts are folded into sofa-form, being designed to engage with or overlap and rest upon the supporting flanges 27 of the brackets 26 immediately in advance of the standards 28 (see Figs. 14 and 15).

As the rear cross-bar 11ª, of the sofa-seat 11, rests upon the side-bars of the end-section, when in sofa-position, the rest pins 20ª will serve to support the rear part of the sofa-seat as well as the end-section when folded.

When closed in sofa-form, as shown in Fig. 4, it will be seen that the legs 19, which are preferably rigid with the seat, will be positioned immediately in rear of the shifting-back 56, and hence, out of the way and invisible. When opened into bed-form, the legs 19 will serve as rigid supports for the front edge of the inverted sofa-seat, the rear edge being supported by the link and lever mechanism heretofore referred to.

Taking the parts in the position in which they are illustrated in Fig. 4, to open the bed, the back 58 is first shifted or elevated to clear the legs 19. The rear edge of the seat 11 is now grasped and swung upward and forward, the front edge of the seat turning on the pivots 9 and 17 and being inverted as it swings to a position of rest in front of the sofa-frame. After being elevated and as the seat swings forward and downward the main and spacing-sections are first unfolded and align in which position they become temporarily locked by the links 34. A further movement of the seat, which is against the tension of the springs 48, serves to swing the rear or back-section 19 upwardly on the studs 24 and cause the pins 29 to ride up the inclined guide-edges 30 of the brackets 26 and standards 28. This operation is against the tension of the springs 31, so that when the pins 29 arrive at the upper ends of the standards 28 said springs will serve to draw the bed-bottom forward the distance of the slots 23, whereby the headed pins 29 will rest upon the upper ends of the standards 28.

By this time, also, the end-section 22 will have assumed its position in horizontal alignment with the remaining sections, so that the bed-bottom as a whole becomes rigidly supported and adapted to serve as a mattress-support.

By lifting the seat and bringing it to the position shown in Fig. 3, the bed-bottom will break at the pivot points 32 and 38, the guide-pins of the rear section 29 riding down the inclined edges of the standards 28 until they pass below the same, such movement being permissible by reason of the stud and slot connection 23 and 24, before described. A continued rearward movement of the seat will now cause the bed-bottom to break at the pivots 33, which up to this point have been held intact by the links 34, so that the bed will fold in the manner shown in Fig. 4, wherein, as will be seen, the sections 21 and 19 occupy substantially vertical positions at the front and rear of the sofa-frame beneath the seat, and the sections 20 and 22 occupy horizontal positions substantially parallel and opposite each other intermediate the sections 19 and 21, these four sections combining to form a space sufficient for the storage of the mattress and bedding (not herein shown), which, it will be understood, are designed to fold and unfold with the bed.

The mechanism described operates smoothly and without jerking or pronounced steps as in most sofa-beds, the parts being well balanced and readily yielding to the slightest impulse or applied force. The bed illustrated consists of four foldable sections, but these may be reduced in number. So also may other means than those shown be substituted for supporting the back-section, ordinary supporting-links, as are commonly employed for this purpose, being usable. So also may other means than those shown and described be employed for throwing the seat. In other words, many of the details of the invention may be modified and are usable in other forms or construction of sofa-beds, and I do not desire to be understood as limiting the use of such details to the particular combinations of details with which they are herein shown and described.

Having described my invention, what I claim, is:

1. In a sofa-bed, the combination, with the sofa-frame, and a movable seat, of a folding bed-bottom comprising a plurality of articulated sections, the rear section of which is connected for pivotal and longitudinal movement upon the sofa-frame, rests connected to the sofa-frame in line with said section when elevated, guides for directing said section to the rests, springs for automatically moving said section longitudinally from the guides to the rests, and means for supporting the remainder of the bed-bottom.

2. In a sofa-bed, the combination, with the sofa-frame, and a movable seat, of a folding bed-bottom comprising a plurality of articulated sections adapted to fold to form a bedding-space beneath the seat, the rear section of said bed-bottom being adjacent its rear edge connected for pivotal and longitudinal movement upon the sofa-frame and to be suspended substantially vertical therefrom and form the rear wall of the bedding-space, pins extending laterally from the sides of said rear section, inclined guides arranged in the path of the pins, supports for the pins at the ends of the guides, means for moving said section longitudinally to the supports when said pins have left the guides, and means for supporting the remainder of the bed-bottom when unfolded.

3. In a sofa-bed, the combination, with the sofa-frame, and a seat connected thereto and adapted to be inverted and become positioned in front of the same, of a bed-bottom comprising four articulated sections adapted to fold in rectangular form beneath the seat when the same is in normal position, means for slidably pivoting the rear section of the bed-bottom adjacent its rear edge to the frame whereby it is suspended substantially vertical from its pivots and is capable of both longitudinal and pivotal movements, rests projecting from the frame in the path of the rear section and adapted to aid in supporting the same when elevated and also in the path of the opposite or outer end-section whereby to support the latter when folded, means for moving said bed-bottom longitudinally when unfolded whereby the rear-section will become positioned upon the rests, and means for supporting the remaining sections and for connecting the bed-bottom to the seat whereby it may be opened and closed by the movements of the latter.

4. In a sofa-bed, the combination with the sofa-frame, a sofa-seat capable of being inverted in front of the sofa-frame, and an articulated mattress-support arranged above the inverted seat and capable of being folded within the frame and below the seat when the latter is within the sofa-frame, of foldable supporting-links between the inverted seat and mattress-support near the front of the latter, supporting links pivoted within the sofa-frame and at their upper ends to the mattress-support near the rear end of the latter, opposite bell-crank levers having their inner branches pivoted at their lower ends near the bottom and front and at the ends of the sofa-frame and adapted at their upper bent ends to extend beyond said sofa-frame, short supporting-links pivoted at their inner ends to the free ends of the bell-cranks and at their outer ends to the adjacent edge of the inverted seat, opposite equalizing-links pivoted at their lower ends within the sofa-frame adjacent to and in rear of the lower pivoted ends of the bell-crank levers and occupying a position substantially parallel with the inner branches of the bell-crank levers, opposite equalizing-bars pivoted at their inner ends to the upper ends of the equalizing-links and at their outer ends to the inverted seat at points above the points of pivot between the seat and the said short supporting-links and also pivoted to the said bell-crank levers at intermediate points and below the points of pivot between the free ends of said levers and the short supporting-links.

5. In a sofa-bed, the combination with the sofa-frame comprising a front connecting-board, and a sofa-seat capable of being inverted in front of the sofa-frame, and an articulated mattress-support arranged above the inverted seat and capable of being folded within the frame and below the seat when the latter is within the sofa-frame, of foldable supporting-links between the inverted seat and mattress-support and between the sofa-frame and the mattress-support, springs connected to the latter links and the sofa-frame, opposite bell-crank levers having their inner branches pivoted near their lower ends near the bottom and front and at the ends of the sofa-frame immediately in rear of the front-board of the latter and adapted at their upper front ends to extend over and beyond the said front-board, short supporting-links having their inner ends pivoted to the forward free ends of said bell-crank levers and their outer ends pivoted to the adjacent edge of the inverted seat, equalizing-links pivoted at their lower ends to the sofa-frame in rear of the bell-crank levers and occupying a position substantially parallel therewith, and straight equalizing-bars having their inner ends pivoted to the upper ends of the equalizing-links and their outer ends pivoted to the adjacent edge of the inverted seat eccentric with the pivots between the short supporting-links and seat and at an intermediate point pivoted to the bell-crank-levers below the points of pivot between the free ends of the latter and the said short supporting-links.

6. In a sofa-bed, the combination, with the sofa-frame, an outwardly folding seat adapted to become inverted and positioned in front of the frame, and supports for said seat, of a four section folding bed-bottom, links connecting the two outer sections with the inverted seat, supporting-links connecting the next intermediate section with the sofa-frame, and a pivotal connection between the rear section and the frame, and intermediate supports for said rear section.

7. In a sofa-bed, the combination, with the sofa-frame, an outwardly folding-seat adapted to become inverted and positioned in front of the frame, and supports for said seat, of a four section folding bed-bottom, links pivoted to the seat and at their upper ends to the two outer sections of the bed-bottom, supporting-links connecting the next intermediate section with the sofa-frame, springs connected to and adapted to aid the supporting-links, a pivotal and movable connection between the rear end of the rear section and the sofa-frame, supports located in advance of said connections, projections on the sides of the rear section, guides in the paths of said projections and adapted to guide the same to the supports, and springs for moving the bed-bottom longitudinally when said projections have passed beyond said guides.

8. In a sofa-bed, the combination, with a sofa-frame, of a movable seat connected thereto, a folding sectional bed-bottom longitudinally movable above the seat, springs for moving the bed-bottom longitudinally, and rests in position to receive and support said bed-bottom when so moved.

9. In a sofa bed, the combination with a sofa frame, of a hinged seat having legs which support the outer side of the seat when it is inverted, a bed bottom of sections pivoted together including a rear section pivotally connected to and supported by the frame, and a single pivoted link extending from each side of each of the two outermost sections to the underside of the seat constituting with the seat the sole upright support for these outermost sections of the bed bottom and serving as a guide for the bed bottom to and from its position beneath the seat to an alined position above the seat.

10. In a sofa bed, the combination with the sofa frame, of a seat adapted to be inverted in front of the frame, rigidly attached means to support the seat when inverted, a four section folding bed bottom, links separately supporting each of the two outer sections from the underside of the seat, supporting links connecting the next inner section with the sofa frame, and a pivotal connection between the rear section and the frame.

11. In a sofa bed, the combination with the sofa frame, of an outwardly folding seat adapted to be inverted at the front of the frame, rigidly attached legs for supporting the seat, a four section folding bed bottom, links separately supporting each of the two outer sections from the underside of the seat, supporting links connecting the next inner section with the sofa frame, and a pivotal connection for the inner end of the innermost section which acts as a support therefor when the sections form a bed.

12. In a sofa bed, the combination with a sofa frame, of a seat adapted to be swung to an inverted position in front of the frame, a folding bed bottom consisting of four unequal sections rectangularly disposed and substantially outlining the space below the seat in the sofa frame leaving a space between the ends of the bed bottom at the rear of the seat to allow bedding to issue therefrom from the space below the seat enclosed by the bed bottom, and means connecting said sections to the seat and sofa frame and constituting the sole support for the bed bottom.

13. In a sofa bed, the combination with the sofa frame, of a movable sofa seat, a four section foldable bed bottom, the rear section of which is pivoted to the rear of the frame, and means including links connecting the other sections to the underside of the seat and to the frame for first alining the two intermediate sections in inverting the seat in front of the frame, and for subsequently alining the four sections in a horizontal plane when the seat is inverted in front of the frame.

14. In a sofa bed, the combination with a sofa frame, of a seat invertible at the front of the frame, a folding sectional bed bottom, means for pivotally connecting the several sections to the underside of the seat and in the frame, and a spring acting in conjunction with certain of the parts to cause the intermediate sections to assume a straight line during the forward inverted movement of the seat and to cushion the return of the sections when the seat is being returned to normal position.

15. In a sofa bed, the combination with a frame, of a seat connected thereto and adapted to be inverted in front of the frame, a folding sectional bed bottom adapted to substantially enclose the entire rectangular space below the seat, a supporting pivotal connection for each bed section extending from certain of the sections to the frame and from others to the seat, and means including a spring attached to the pivotal connection for one of the intermediate sections for causing it and an adjacent intermediate section to be alined when the seat is raised and to maintain their alinement as the seat is lowered to inverted position, whereupon they become alined above the seat with the other bed sections.

16. In a sofa bed, the combination with a sofa frame; of a seat mounted in the frame and adapted to be inverted in front of the frame; a sectional bed bottom foldable within the frame to substantially enclose the entire rectangular space below the seat and comprising a back, main, spacing and end sections, a single pivoting connection at each side of each of the sections, between the sofa frame and the back and main sections and between the underside of the seat and the spacing and end sections, whereby the sections will be folded into rectangular position below the seat or will be extended in horizontal position above the seat; and the end section being shorter than the main section so that when the sections are folded below the seat there will be a space between the end section and the back section through which the bed clothes may be extruded when the bed sections are folded.

17. In a sofa bed, the combination with a sofa frame, of a seat therefor mounted to be inverted in front of the frame, means fixed to the seat to support it in inverted position, a sectional bed bottom foldable within the frame below the seat comprising a back section pivoted at its rear end in the frame and extending downward at the back thereof, a main section pivotally connected to the lower end of the back section and extending along the bottom of the frame, a spacing section extending downwardly below the seat, an end section directly below the seat, a single supporting means extending separately from beneath the seat at each side thereof for each of the spacing and end sections, and a single support at each side of the frame for the main section to aid in extending all of the sections upwardly and forwardly into an alined horizontal position when the seat is inverted.

In testimony whereof I have signed my name to this specification in the presence of two subscribing witnesses.

DARRELL FRANK DYKE.

Witnesses:
F. H. ELWERT,
JOHN M. BROST